(12) United States Patent
Lee (10) Patent No.: US 9,829,657 B2
(45) Date of Patent: Nov. 28, 2017

(54) CONNECTOR

(71) Applicants: JT, Inc., Suwon-si, Gyeonggi-do (KR); Sang Lo Lee, Suwon-si, Gyeonggi-do (KR)

(72) Inventor: Sang Lo Lee, Suwon-si (KR)

(73) Assignees: JT, Inc., Suwon-si, Gyeonggi-do (KR); Sang Lo Lee, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/173,183

(22) Filed: Jun. 3, 2016

(65) Prior Publication Data
US 2017/0052330 A1  Feb. 23, 2017

(30) Foreign Application Priority Data
Aug. 17, 2015 (KR) .................. 10-2015-0115145

(51) Int. Cl.
*G02B 6/42* (2006.01)
*G02B 6/38* (2006.01)

(52) U.S. Cl.
CPC ......... *G02B 6/3893* (2013.01); *G02B 6/4261* (2013.01); *G02B 6/4284* (2013.01); *G02B 6/4292* (2013.01)

(58) Field of Classification Search
None
See application file for complete search history.

(56) References Cited

U.S. PATENT DOCUMENTS

| | | | | |
|---|---|---|---|---|
| 4,337,989 A | * | 7/1982 | Asick .................. | H01R 13/6595 174/359 |
| 2008/0050070 A1 | * | 2/2008 | Gurreri ................ | G02B 6/3849 385/55 |
| 2009/0191738 A1 | * | 7/2009 | Kadar-Kallen ........ | G02B 6/389 439/207 |
| 2012/0213478 A1 | * | 8/2012 | Chen ..................... | G02B 6/387 385/62 |
| 2013/0301993 A1 | * | 11/2013 | Toda ..................... | G02B 6/36 385/76 |
| 2017/0052330 A1 | * | 2/2017 | Lee ...................... | G02B 6/3893 |

FOREIGN PATENT DOCUMENTS

KR   1013910390000   4/2014

* cited by examiner

*Primary Examiner* — Jerry Rahll
(74) *Attorney, Agent, or Firm* — Baker Donelson, PC; Royal W. Craig (57) ABSTRACT

A connector is provided the connector including a plug selectively coupled to a transceiver including a socket, a coupling pan coupled to the socket when the plug is coupled to the transceiver, a coupling release part accommodating the coupling part and selectively releasing the coupling part from the socket, and a both ends-opened cylindrical outer housing accommodating therein the plug, the coupling part and the coupling release part and inwardly formed at one end with a bending part to allow the bending part to selectively apply a pressure to the coupling release part. The present disclosure is configured in a manner such that engagement (coupling) or disengagement (decoupling) of coupling can be possible by a simple manipulation of pushing or pulling of a connector by mounting a coupling part and a coupling release part.

20 Claims, 5 Drawing Sheets

CONNECTOR

CROSS-REFERENCE TO RELATED APPLICATION(S)

The present application is based on, and claims priority from the Korean Patent Application Number 10-2015-0115145 filed on Aug. 17, 2015, which is incorporated herein by reference in its entirety.

BACKGROUND OF THE INVENTION

1. Field of the Invention

The present disclosure relates to a connector, and more particularly to a connector engageable (coupleable) or disengageable (decoupleable) in a push-pull manner.

2. Description of the Background

In general, connectors are used to electrically connect a power source to a device, a device to another device, and an inner unit to another inner unit inside a device, or to connect the devices or the units to allow an optical signal to be transmitted. Many optical systems use a transceiver which includes both transmission and receiver in a single module, and light to/from the transceiver is coupled into the fiber with a connector. Connectors may generally be coupled (engaged) to a receptacle socket (hereinafter referred to as "socket"). The technology for securing a strong coupling (engagement) between a socket and a connector is well known in the industry lest the connector be decoupled (disengaged) from the socket once the connector is coupled to a socket.

For example, Korean registered patent No.: 10-1391039 discloses a technology of a connector assembly being coupled to a socket by forming respective corresponding screw threads on an inner surface of an outer housing, and an outer surface of the socket. However, although the Korean Registered Patent No: KR10-1391039 has an advantage of strengthening a coupling, there is a disadvantage of requiring a separate manipulation including rotation of an outer housing when a connector assembly and a socket is coupled or decoupled.

SUMMARY OF THE INVENTION

The present disclosure is provided to solve the aforementioned problems or disadvantages, and it is an object of the present disclosure to provide a connector n configured to couple and decouple a socket by slide-pushing an outer housing toward the socket and slide-pulling the outer housing from the socket.

It is another object of the present disclosure to provide a connector configured to prevent damage to a connector by preventing rotation after being coupled to the socket.

It is still another object of the present disclosure to provide a connector configured to strengthen a coupling with a socket by mounting a coupling member coupleable to an outer surface of the socket. Technical subjects to be solved by the present disclosure are not restricted to the above-mentioned description, and any other technical problems not mentioned so far will be clearly appreciated from the following description by the skilled in the art.

An object of the present disclosure is to solve at least one or more of the above problems and/or disadvantages in whole or in part and to provide at least the advantages described hereinafter.

In order to achieve at least the above objects, in whole or in part, and in accordance with the purposes of the present disclosure, as embodied and broadly described, and in one general aspect of the present disclosure, there is provided a connector, the connector comprising a plug selectively coupled to a transceiver including a socket;

a coupling part coupled to the socket when the plug is coupled to the transceiver;

a coupling release part accommodating the coupling part and selectively releasing the coupling part from the socket; and a both ends-opened cylindrical outer housing accommodating therein the plug, the coupling part and the coupling release part and inwardly formed at one end with a bending part to allow the bending part to selectively apply a pressure to the coupling release part.

Preferably, but not necessarily, any one of the socket and the outer housing may be protrusively formed with a rotation prevention lug in a mutually facing direction, and the other one of the socket and the outer housing may be formed with a rotation prevention groove inserted by the rotation prevention lug to prevent the socket and the outer housing from rotating while the socket and the outer housing are being coupled.

Preferably, but not necessarily, the coupling part may include a coupling piece extended to a socket side by being protruded outwardly, where the coupling piece is formed at one end with an inwardly-protruded coupling lug, and the coupling piece is inserted into the coupling groove formed at an outer surface of the socket, when the plug and the socket are coupled.

Preferably, but not necessarily, the coupling release part may include a through hole through which the coupling piece passes, and a disengagement member formed at one end of the through hole to selectively disengage the coupling lug from the coupling groove of the socket.

Preferably, but not necessarily, the coupling lug may include a first slope tapering off to the other direction of the coupling piece, wherein the disengagement member may include a second slope at an outer surface that tapers off in response to the first slope, and the first slope and the second slope may be slidable by being mutually abutted.

Preferably, but not necessarily, the coupling part may be provided with a plurality of coupling pieces, each spaced apart at a predetermined distance, wherein an outer surface of the plurality of coupling pieces may include a protruded first lug, and the coupling release part may include a second lug so protruded as to interact with the coupling part by being hitched at the lust lug when the coupling part moves to be coupled with the socket.

Preferably, but not necessarily, the coupling release part may be formed with a wing piece extended to a direction distancing from the socket, and the wing piece may include a third lug outwardly protruded from a distal end, and the outer housing may include at an inner surface an inner groove to interact with the coupling release part by being hitched at the third lug when the coupling part moves to be coupled with the socket.

Preferably, but not necessarily, the connector may further comprise:

a latch coupled to the transceiver when the plug is coupled to the transceiver; and a latch release part disposed at an outside of the plug to release the coupling between the latch and the transceiver by applying a pressure to the latch in response to movement of the outer housing.

Preferably, but not necessarily, the connector may further comprise a guide part disposed at one side of the coupling part to accommodate the latch release part, and to guide the plug by allowing an outer surface to be oppositely disposed with an inner surface of the socket when the plug moves to be coupled to the socket.

Preferably, but not necessarily, the connector may further comprise an inner housing so arranged as to interact with the guide part in order to accommodate a part of the latch release part, and in order to accommodate a cable electrically connected to the plug or so connected as to transmit an optical signal, wherein the inner housing may further include, at an outer surface, a stopper configured to prevent the coupling release part from sliding by being distanced from a distal end of the coupling release part when the coupling release part slides to a direction distancing from the socket along the outer surface of the inner housing.

Preferably, but not necessarily, a distal end of the guide part may be interposed between a distal end of the coupling part and the socket when the coupling part is coupled to the transceiver.

Preferably, but not necessarily, a first sealing member may be interposed between the guide part and the coupling part.

Preferably, but not necessarily, the socket may be formed, at a surface opposite to the transceiver, with a sealing groove, where the sealing groove may be arranged with a second sealing member.

The present disclosure is advantageous in that engagement (coupling) or disengagement (decoupling) of coupling to socket can be possible by a simple manipulation of pushing or pulling of a connector by mounting a coupling part and a coupling release part. Furthermore, the present disclosure is advantageous in that a rotation prevention member is disposed to prevent an outer housing from rotating, whereby rotation of plug coupled to a transceiver is avoided to thereby prevent a coupling defect of connector or damage to a device can be prevented in advance.

DETAILED DESCRIPTION

Hereinafter, exemplary embodiments of the present disclosure will be described with reference to the exemplary drawings. In designating elements in the drawings as reference numerals, wherever possible, the same reference numerals are used to refer to the same element, even though the same elements are illustrated in different drawings. In addition, in describing exemplary embodiments of the present disclosure, the detailed description may be omitted When it is determined that a detailed description about known function or structure relating to the present disclosure may disturb understanding of exemplary embodiments of the present disclosure.

In addition, in describing elements of exemplary embodiments of the present disclosure, the terms such as "first", "second" "A", "B", "(a)" and "(b)" may be used. However, such terms are used merely to distinguish a particular element from another element, and therefore, essence, order or sequence of the relevant elements shall not be limited by the terms. It will be understood that when an element is referred to as being "connected", "contacted" or "coupled" to another element, it can be directly connected, contacted or coupled to the other elements, or otherwise, an intervening elements may be "connected", "contacted" or "coupled" between the element and the other element, As used herein, the term "coupling" and "decoupling" may be interchangeably used with "engagement" and "disengagement". Hereinafter, a connector will be described in detail according to an exemplary embodiment of the present disclosure.

Figure 1:
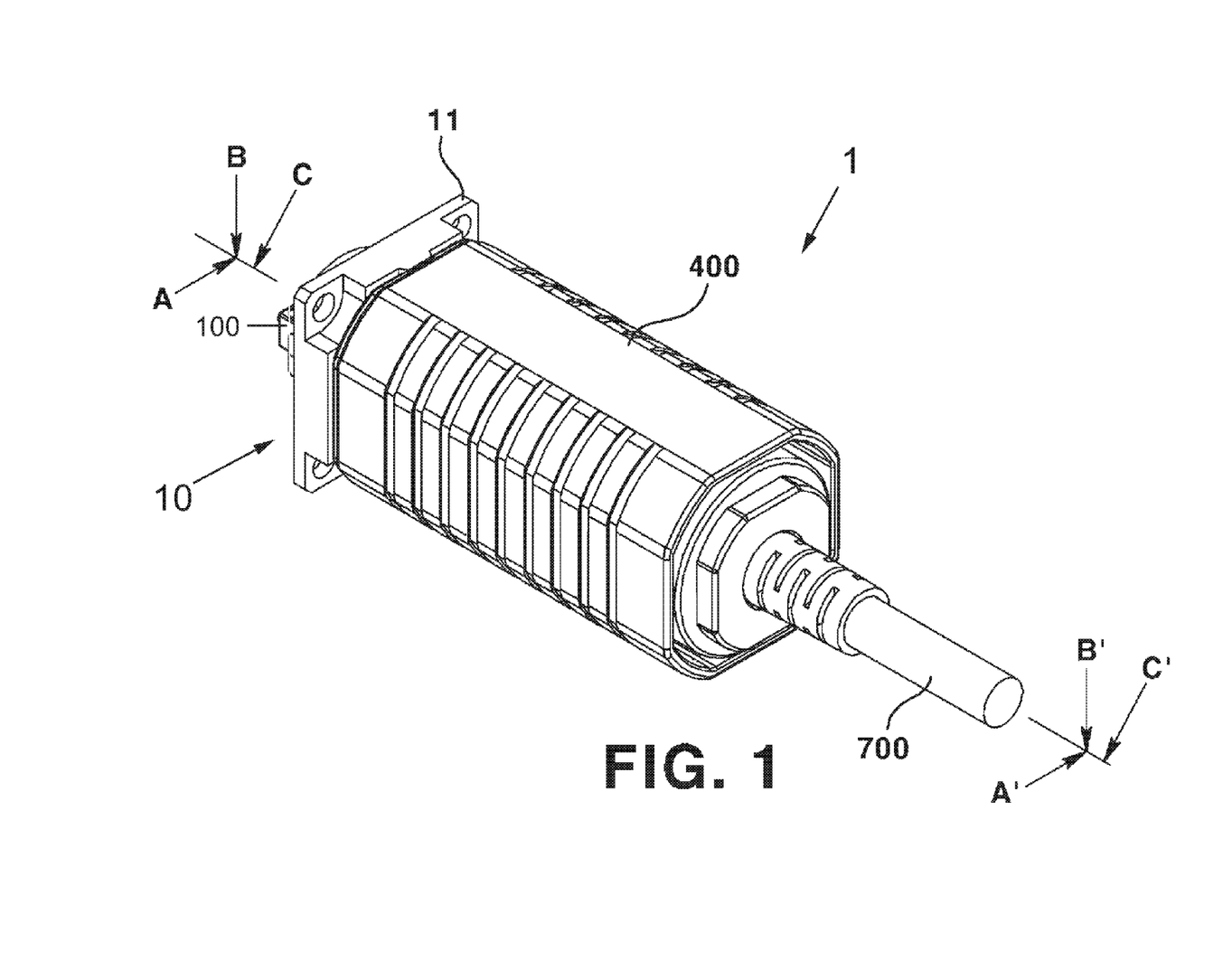
FIG. 1 is a perspective view illustrating a connector coupled to a socket according to an exemplary embodiment of the present disclosure.

FIG. 1 is a perspective view illustrating a connector (1) coupled to a socket (10) according to an exemplary embodiment of the present disclosure.

Figure 2:
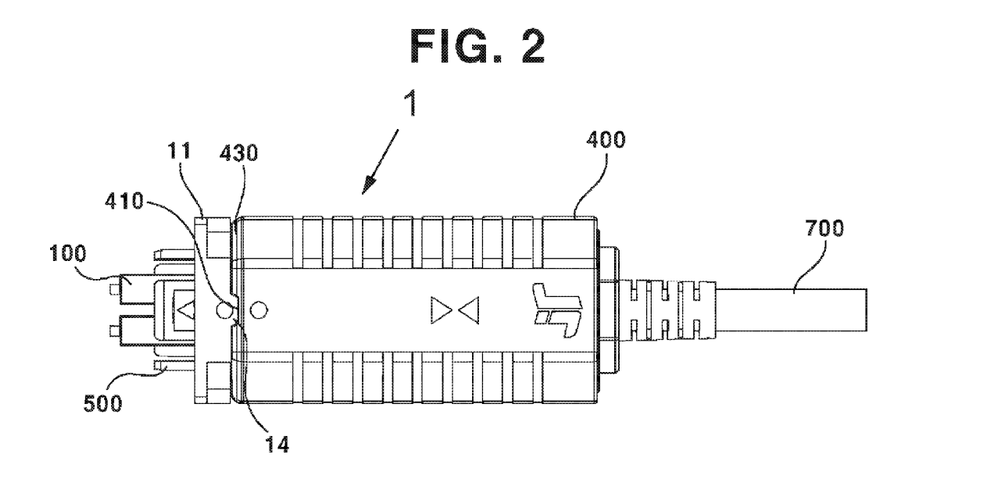
FIG. 2 is a plane view illustrating a connector according to an exemplary embodiment of the present disclosure.

FIG. 2 is a plane view illustrating a connector (1) according to an exemplary embodiment of the present disclosure.

Figure 3:
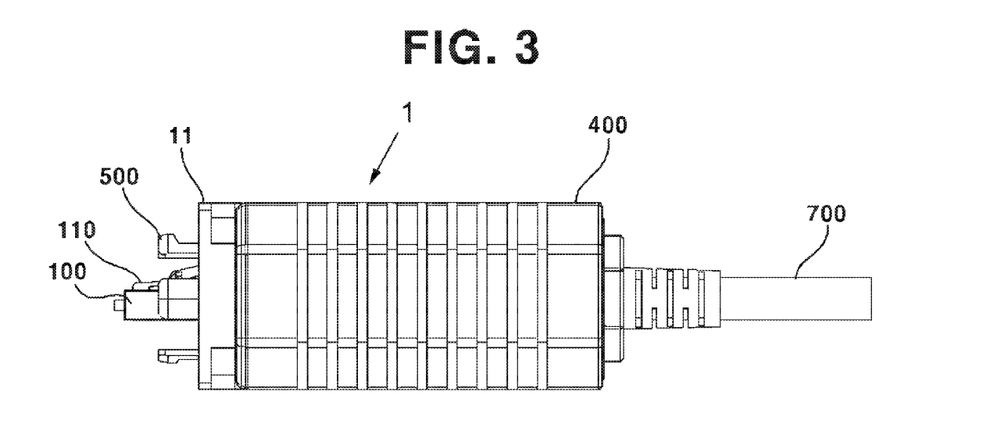
FIG. 3 is a lateral view illustrating a connector according to an exemplary embodiment of the present disclosure.

FIG. 3 is a lateral view illustrating a connector (1) according to an exemplary embodiment of the present disclosure.

Figure 4:
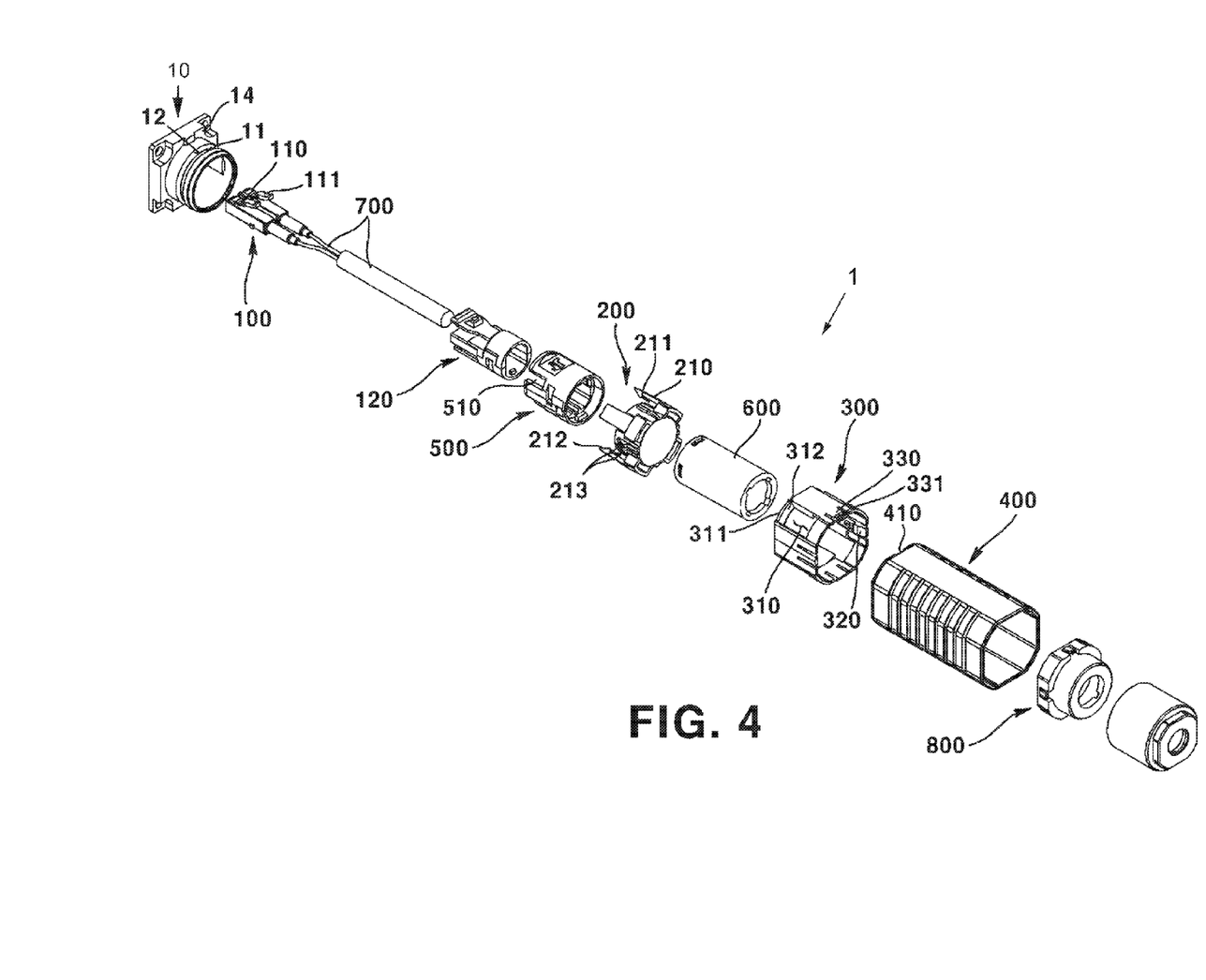
FIG. 4 is an exploded perspective view of a connector according to an exemplary embodiment of the present disclosure.

FIG. 4 is an exploded perspective view of a connector (1) according to an exemplary embodiment of the present disclosure.

Figure 5:
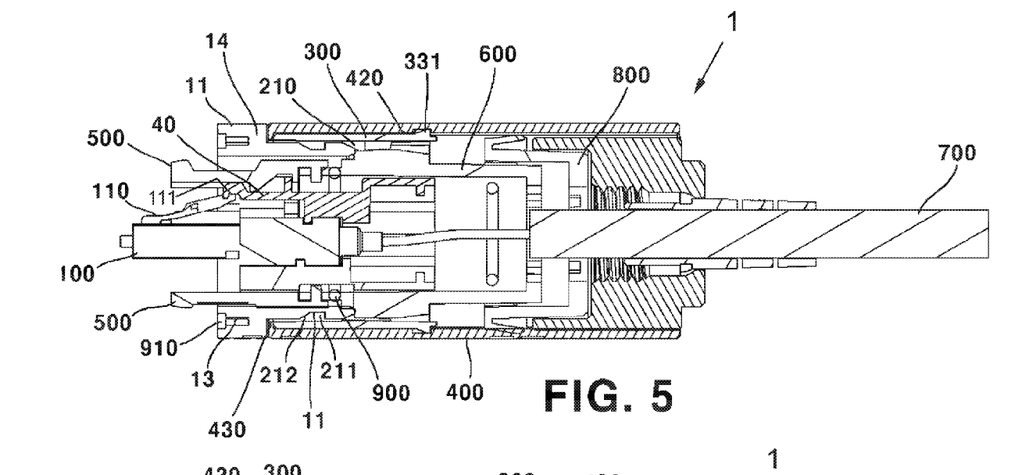
FIG. 5 is a cross-sectional view taken along line A-A' of FIG. 1.

FIG. 5 is a cross-sectional view taken along line A-A' of FIG. 1.

Figure 6:
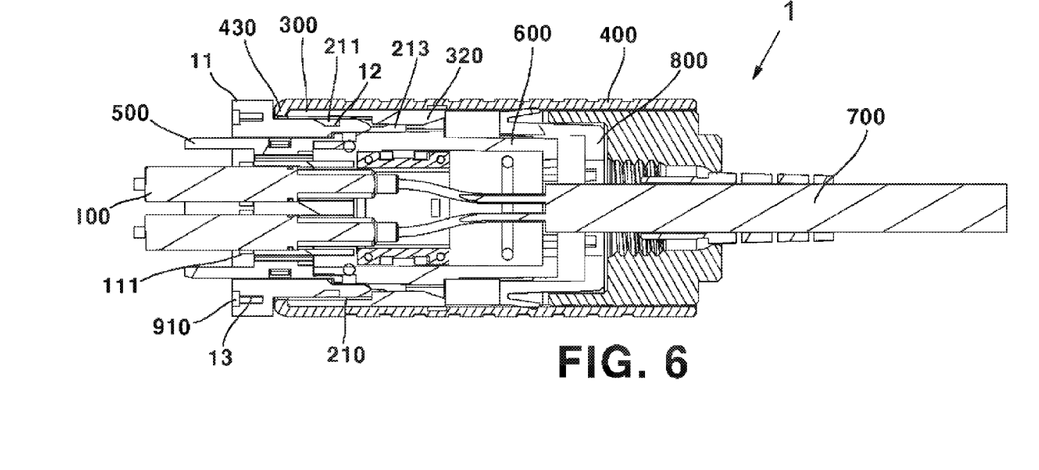
FIG. 6 is a cross-sectional view taken along line B-B' of FIG. 1.
Figure 7:
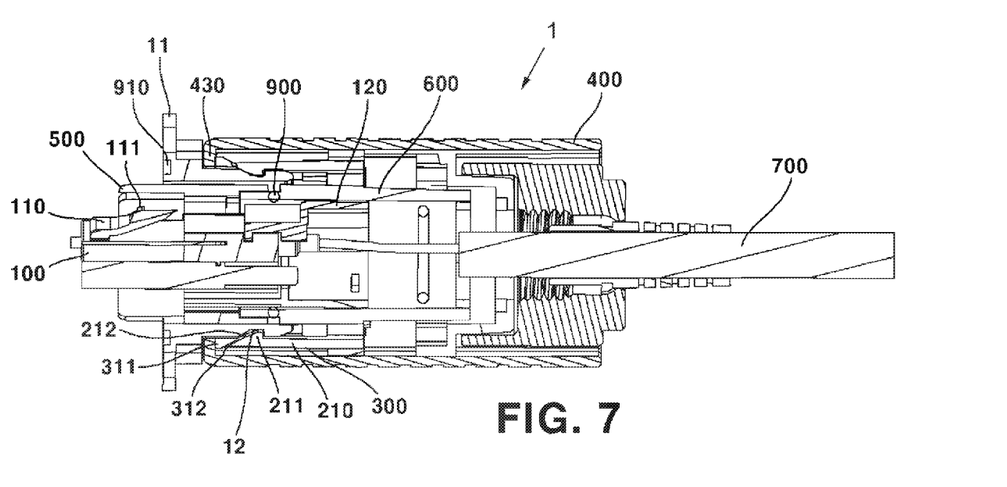
FIG. 7 is a cross-sectional view taken along line C-C' of FIG. 1.

FIG. 6 is a cross-sectional view taken along line B-B' of FIG. 1, and FIG. 7 is a cross-sectional view taken along line C-C' of FIG. 1.

Referring to FIGS. 1 to 7, the connector (1) according to an exemplary embodiment of the present disclosure may include a plug (100), a coupling part (200), a coupling release part (300) and an outer housing (400). A transceiver (not shown) formed at a case (not shown) may include a socket (10). The socket (10) may be coupled to the connector (1) by its annular flange that is protruded outside of the case. The annular flange of the socket (10) may be farmed at an outer surface with a coupling groove (11). The coupling groove (11) captures a coupling lug (211, described later) of the coupling part (200). Thus, the connector (1) and the socket (10) may be coupled together. Furthermore the socket (10) may be configured such that a sealing shoulder (12) is formed at a surface opposite to the case. The socket (10) may be attached to the case using a coupling member (not shown) such as a screw (not shown). As seen in FIGS. 5-6, the socket (10) may be provided with a rotation prevention lug (13) to prevent the outer housing (400, described later) from rotating when the plug (100) is coupled to the transceiver.

The plug (100) may be electrically connected at one end to the transceiver in response to a user selection to transmit an optical signal, and may be connected at the other end to a cable (700, described later). Furthermore, the plug (100) may be formed with a latch (110). The latch (110) may have elasticity. That is, the latch (110) may be extended at one end from one surface of the plug (100) and extended at the other end to a direction distancing from the socket (10). The latch (110) may include a latch lug (111) protruded to a lateral direction from an outer surface. When the plug (100) is coupled to the transceiver, the latch lug (111) may be inserted into a groove (not shown) formed at the transceiver to allow the plug (100) to be coupled to the transceiver.

As seen in FIG. 4, the coupling part (200) may take a cylindrical shape opened at both ends, and may accommodate at an inner side the plug (100) and an inner housing (600 described later). The coupling part (200) may include coupling arms (210). The coupling arms (210) may protrude from an outer surface of the coupling part (200) toward socket (10) side. The coupling arms (210) are preferably formed in a plural number. For example, the drawings illustrate four (4) coupling arms (210), each spaced apart at a predetermined distance. At least two coupling arms (210) must be formed to allow the coupling part (200) to be coupled to the socket (10).

The plurality of coupling arms (210) may be preferably arranged at equidistance from each other. When three coupling arms (210) are formed, the three coupling arms (210) may be arranged along an outer surface of the coupling part (200) while maintaining a 120° equidistance from each other. Furthermore, when four coupling arms (210) are formed, the four coupling arms (210) may be arranged along an outer surface of the coupling part (200) while maintaining 90° equidistance from each other. That is, the number of coupling arms (210) is not limited to a certain number, but may be determined by intention of manufacturer. An inner surface of the coupling arm (210) may face an outer surface of the socket (10) when the connector (1) moves to a direction to couple with the transceiver. Each coupling arm (210) may be formed at one end with a coupling lug (211) to protrude to an inner side of the coupling part (200). The other end of the coupling arm (210) may be extended from and integral to an outer surface of the coupling part (200). Thus, when the plug (100) and the transceiver are coupled, the coupling lug (211) may be inserted into coupling groove (11) formed around an outer surface of the socket (10). The coupling lug (211) may be formed with ramped first slope (212) tapering off toward the distal ends of the coupling arm (210). This way, the distal end of the socket (10) may abut the first slope (212) when the coupling arm (210) encounters it, the socket (10) spreading the arm (210) until it clears the outer surface of the socket (10). Furthermore, the coupling part (200) may continue to slide along the outer annular surface of the socket (10) when the coupling arm (210) is spread to its outer side, until the coupling lug (211) snaps back into the coupling groove (11) by elasticity.

The coupling part (200) may include a first catch (213) protruding up from the coupling part (200) between the coupling arms (210), that is, interspaced between the plurality of coupling arms (210). The first catches (213) each interact with a resilient hasp (320) of a coupling release part (300), described later.

The coupling release part (300) may take a hollow pillar shape opened at both ends, and may accommodate therein the coupling part (200). The coupling release part (300) may release the coupling part (200) from the socket (10). The coupling release part (300) may be formed with a wall surface forming a body with one or more through holes (310) there through. The through hole(s) (310) may be formed at a position corresponding to a position and the number of the coupling arm(s) (210) to allow one end of each coupling arm (210) to pass there through.

Furthermore, the coupling release part (300) may further include at a front end of the through hole (310) a disengagement member (311) bordering through hole (310) at one end of the coupling release part (300). The disengagement member (311) may selectively disengage the coupling lug (211) inserted into the coupling groove (11) of the socket (10) through sliding of the coupling release part (300). The disengagement member (311) may include a second ramped surface (312) sloping upward toward the socket (10) in order to Correspond to the first ramped surface (212) of the coupling lug (211). Furthermore, the first ramped surface (212) can be abutted to the second ramped surface (312). This way, the disengagement member (311) may disengage the coupling lug (211) from the coupling groove (11), as the coupling release part (300) slides away from the socket (10). At this time, the plurality of coupling arms (210) can be widened from each other. When the coupling part (200) is separated from the socket (10), the plurality of coupling arms (210) can be restored to their original shape by their elasticity. Furthermore, when the connector (1) is coupled to the transceiver, the disengagement member (311) may be positioned relatively nearer to a case (not shown) mounted with the transceiver than one end of the coupling arms (210).

The coupling release part (300) may be provided at the other end with a plurality of detent flaps (330) extending away from the socket (10). Furthermore, the plurality of detent flaps (330) may each include at a distal end an inwardly protruding second lug (320). The second lug(s) (320) may interact with the coupling part (200) by becoming hitched to the first lug(s) (213) of the coupling part (200) when the plug (100) is moved to be coupled with the transceiver. Thus, the first lug(s) (213) and the second lug(s) (320) may be correspondingly formed in terms of numbers and positions thereof. Each of the plurality of detent flaps (330) may be arranged by being spaced apart at a predetermined distance. Any part of the plurality of detent flaps (330), that is, a flap (330) not formed with the second lug (320), may include at a distal end a third lug (331) that is protruded outwardly.

The third lug (331) may be hitched to an inner groove (420) of outer housing (400) by being inserted into the inner groove (420) formed inwardly in the outer housing (400), described later), Thus, the coupling release part (300) and the outer housing (400) may interact together. FIG. 4 illustrates four detent flaps (330), and the second lug (320) is formed at an outer surface of an opposite detent flap (330). The number of detent flaps (330) and the second lug (320) may be variably formed according to intention of manufacturer.

The connector (1) according to an exemplary embodiment of the present disclosure may further include a latch release part (120) as seen in FIG. 4. The latch release part (120) may accommodate therein the plug (100). The latch release part (120) may apply pressure to the latch (110). That is, when the plug (100) is coupled to the transceiver, a latch lug (111) of the latch (110) may be coupled by being hitched to a groove (not shown) formed in the transceiver. Furthermore, when the outer housing (400), described later, is moved away from the socket (10) by a user, the latch release part (120) may apply a pressure to the other end of the latch (110) to disengage the latch lug (111) from the groove of the transceiver.

The connector (1) according to an exemplary embodiment of the present disclosure may further include a guide part (500). The guide part (500) may assume a pillar shape open at both ends to accommodate the latch release part (120). When the plug (100) is coupled to the transceiver through the socket (10), the guide part (500) may function to guide the plug (100) into the transceiver inside the socket (10). That is, the guide part (500) may be inserted at one end into the socket (10), the outer surface of guide part (500) facing an inner surface of the socket (10). Furthermore, the guide part (500) may slide along an inner surface of the socket (10). Thus, the plug (100) may be electrically connected to the transceiver by being coupled to the transceiver, or may be so connected to the transceiver as to transmit an optical signal. The guide part (500) may be interposed between the latch release part (120) and the socket (10) when the plug (100) is coupled to the transceiver. The other end of the guide part (500) may be inserted into a space between the outer surface of the coupling part (200) and the coupling arms (210) protruding from the coupling part (200). Furthermore, the guide part (500) may be formed at one end with a notch (510) that allows the coupling lug (211) of the coupling piece (210) to slide without interference. One end of the guide pan (500) may be preferably disposed between one end of the plug (100) and the socket (10) when the plug (100) is coupled to the transceiver. If the guide part (500) is not disposed between one end of the plug (100) and the socket (10), the plug (100) may be hindered from being coupled to the transceiver by the length of the guide part (500), or it may be impossible to guide the plug (100) along an inner surface of the socket (10). As seen in FIGS. 5-6 a first sealing member (900) such as an O-ring may be interposed between the guide part (500) and the coupling part (200).

The other end of the guide part (500), i.e., the distal end facing away from the socket (10), may be disposed with an inner housing (600), where the guide part (500) and the inner housing (600) may interact together. The inner housing (600) may be arranged between the plug (100) and the coupling part (200), and may interact with the guide part (500). The inner housing (600) may engage a part of the latch release part (120). The inner housing (600) may centrally accommodate a cable (700) electrically connected to the plug (100) or to transmit an optical signal.

Furthermore, the inner housing (600) may be fitted on one outside end with a stopper (800). The stopper (800) may be spaced apart from the other end of the coupling release part (300). The stopper (800) may prevent the coupling release part (300) and the inner housing (600) from sliding when the coupling release part (300) slides away from the socket (10) along an outer surface of the inner housing (600).

The connector (1) according to an exemplary embodiment of the present disclosure may include an outer housing (400) accommodating all the elements mentioned above except for the socket (10). The outer housing (400) may likewise be a hollow pillar shape open at both ends. An outer surface of the outer housing (400) may be designed to be grasped by hand. That is, the outer housing (400) may further include Surface-roughened slippage-prevention features (not shown number) as shown in the drawing. When the coupling part (100) is coupled to the transceiver, the outer housing (400) may be formed with a rotation prevention notch (410) shown in FIG. 4, that corresponds to the rotation prevention lug (13) of the socket (10) in order to prevent relative rotation. In the drawings, the rotation prevention lug (13) is illustrated at the socket (10), and the rotation prevention groove (410) is illustrated as being formed at the outer housing (400). However, the reverse configuration may be also possible, and any configuration capable of preventing rotation of the outer housing (400) may be additionally applied according to intention of the manufacturer.

As seen in FIGS. 5-7, the outer housing (400) may be formed at an inner surface with an inner groove (420) that seats the third lug (331) of the coupling release part (300). Thus, the third lug (331) may be hitched into the inner groove (420) when the outer housing (400) slides toward socket (10). The outer housing (400) may be formed with a lip (430) furled inwardly at one end. The lip (430) may abut one end of the coupling release part (300). The lip (430) may selectively apply a pressure to the coupling release part (300) in a direction away from the socket (10) in response to user action. That is, the lip (430) may apply pressure to the disengagement member (311) in a direction away from the socket (10). The disengagement member (311) may spread/widen the coupling arms (210) toward the outside. Thus, the coupling lugs (211) of the coupling arms (210) may be disengaged from the coupling groove (11) of the socket (10). Furthermore, the plug (100) can be separated from the transceiver.

The connector (1) according to an exemplary embodiment of the present disclosure may be used in the following fashion.

First of all, a user prepares a connector (1) according to an exemplary embodiment of the present disclosure. Then, the user grasps the outer housing (400). At this time, the user ascertains a mark of the outer housing (400) or a shape of the plug (100). Thereafter, the user determines a position or an arrangement of the connector (1) to be correspondingly inserted into the transceiver.

Successively, the user inserts the plug (100) into the socket (10) to allow the plug (100) to be coupled to the transceiver of a case (not shown). At this time, a distal end of the socket (10) abuts one end of the coupling part (100). Furthermore, when the outer housing (400) is moved toward socket (10) by a user, the plurality of coupling arms (210) formed on coupling part (200) are spread/widened to the outside, whereby an inner surface of the coupling arms (210) face the outer surface of the socket (10), and the coupling arms (210) slide along the outer surface of the socket (10). The coupling lugs (211) protruding inwardly from the arms (210) of the coupling piece (210) may be inserted into the coupling groove (11) formed at the outer surface of the socket (10). Thus, the connector (1) may be coupled to the socket (10). The transceiver and the coupling part (100) may be electrically connected or connected to allow an optical signal to be transmitted. Furthermore, the coupling part (100) is inserted into the transceiver, and the latch lug (111) of the latch (110) is inserted into the groove (not shown) of the transceiver to enable the connector (1) and the transceiver to be coupled.

The interaction of the above-mentioned components will be described in more details.

When a user applies a force to allow the outer housing (400) to slide toward the socket (10), the coupling release part (300) engages the outer housing (400) because the third lug (331) of the coupling release part (300) is hitched to the inner groove (420) at an inner surface of the outer housing (402). Furthermore, the second lug (320) that protrudes. inwardly from the detent flaps (330) of the coupling release part (300) are hitched tot the first lug (213) of the coupling part (200). Thus, the coupling part (200) moves toward the socket (10). As the coupling part (200) moves toward the socket (10) the guide part (500) may also move toward the socket (10). Because the guide part (500) interacts with the latch release part (120) and the inner housing (100), these elements may also move toward the socket (10). Thus, when the plug (100) is coupled to the transceiver, the latch lug (111) formed at the latch (110) may be inserted into the groove (not shown) of the transceiver. Furthermore, the coupling lug (211) of the coupling part (200) may be inserted into the coupling groove (11) of the socket (10). Thus, the connector (1) according to an exemplary embodiment of the present disclosure may be doubly coupled with the socket (10) or the transceiver to further strengthen the coupling.

Now, the connector (1) according to an exemplary embodiment of the present disclosure may be separated from the transceiver in the following manner.

First of all, a user may grasp an outer surface of the outer housing (400) using a hand in order to separate the connector (1) from the socket (10). Then, the user may pull the outer housing (400) in a direction away from the socket (10). The lip (430) of the outer housing (400) may apply a pressure to allow the disengagement member (311) of the coupling release part (300) to be distanced from the socket (10). The second ramped surface (312) of the disengagement member (311) may abut the first ramped surface (212) of the coupling lugs (211) that inwardly protrude from the coupling arms (210) of the coupling part (200). Thus, the disengagement member (311) moves toward the socket (10) to disengage the coupling lug (211) from the coupling groove (11) of the socket (10). At this time, the coupling piece (210) formed with the coupling lug (211) may be widened to an outside of the coupling part (200).

Next, the guide part (500) may apply a pressure to the latch release part (120) while moving away from the socket (10). The latch release part (120) may apply a pressure to the latch (110) to separate the latch lug (111) inserted into the groove (not shown) of the transceiver. Hence, the plug (100) may be disengaged from the transceiver or the socket (10). At this time, the guide part (500), the latch release part (120) and the inner housing (600) may be interacted. The stopper (800) may be disposed when these elements move away from the socket (10). The stopper (800) may be limited in movement to a predetermined distance from the inner housing (600) and the coupling release part (300) inside the outer housing (400).

In the above, exemplary embodiments of the present disclosure have been described. However, these embodiments are merely examples and do not limit the present disclosure, so that persons who skilled in the an of the present disclosure may easily transform and modify within the limit of the technical spirit of the present disclosure. For example, each of the components shown in detail in the embodiments of the present disclosure may be implemented in transformation. In addition, the differences relating these transformations and modifications shall be regarded to be included in the scope of the present disclosure as defined in the attached claims of the present disclosure and the equivalents thereof.

I claim:

1. A connector for electrical connection to an optical transceiver by mechanical connection to a socket, the connector comprising:
   a plug;
   a coupling part releasably engaged to the socket when the plug is inserted therein;
   a coupling release part telescopically engaged to the coupling part for selectively releasing the coupling part from the socket; and
   an open-ended substantially cylindrical outer housing accommodating therein the plug, the coupling part and the coupling release part, said housing having an inward lip at one end to abut and selectively apply pressure to the coupling release part.

2. The connector of claim 1, wherein one of the socket and the outer housing is formed with a rotation prevention lug, and the other one of the socket and the outer housing is formed with a rotation prevention groove configured to engage said lug to prevent the socket and the outer housing from rotating.

3. The connector of claim 1, wherein the coupling part includes two or more axially-extending coupling arms extended toward said socket.

4. The connector of claim 3, wherein each of said two or more axially-extending coupling arms are formed at one end with an inwardly-protruding coupling lug for engaging an outer surface of the socket.

5. The connector of claim 3, wherein the coupling release part has one or more through holes through which each of said two or more coupling arms pass.

6. The connector of claim 5, wherein the coupling release part has one or more disengagement members bordering said one or more through holes to selectively disengage the coupling lug from the coupling groove of the socket.

7. The connector of claim 6, wherein each of said coupling lugs includes a first ramped surface having a slope tapering along said the coupling arm.

8. The connector of claim 7, wherein each of said disengagement members include a second ramped surface having a slope conforming to the first slope.

9. The connector of claim 6, wherein the coupling part is provided with a plurality of coupling arms spaced apart at a predetermined distance, and an outer surface of the plurality of coupling arms includes a protruding first lug.

10. The connector of claim 9, wherein the coupling release part includes a second lug cooperating with the coupling part by engagement to the first lug when the coupling part moves toward the socket.

11. The connector of claim 1, wherein the coupling release part is formed with a detent tab extended away from the socket.

12. The connector of claim 11, wherein the detent tab includes a third lug outwardly protruding from a distal end.

13. The connector of claim 12, wherein the outer housing has an inner surface configured with an inner groove to interact with the coupling release part by engagement of the third lug when the coupling part moves toward the socket.

14. The connector of claim 1, further comprising:
   a latch coupled to the transceiver when the plug is coupled to the transceiver; and
   a latch release part disposed outside of the plug to release the coupling between the latch and the transceiver by applying pressure to the latch in response to movement of the outer housing.

15. The connector of claim 14, further comprising a guide part disposed at one side of the coupling part to accommodate the latch release part, and to guide the plug by allowing an outer surface thereof to face an inner surface of the socket when the plug moves to be coupled to the socket.

16. The connector of claim 15, further comprising an inner housing configured to interact with the guide part in order to accommodate the latch release part, and to accommodate a cable electrically or optically connected to the plug.

17. The connector of claim 16, wherein the inner housing further includes a stopper configured to prevent the coupling release part from sliding.

18. The connector of claim 15, wherein a distal end of the guide part is interposed between a distal end of the coupling part and the socket when the coupling part is coupled to the transceiver.

19. The connector of claim 16, wherein a first sealing member is interposed between the guide part and the coupling part.

20. The connector of claim 1, wherein the socket is configured with a sealing shoulder and a second sealing member.

* * * * *